United States Patent Office 2,995,204
Patented Aug. 8, 1961

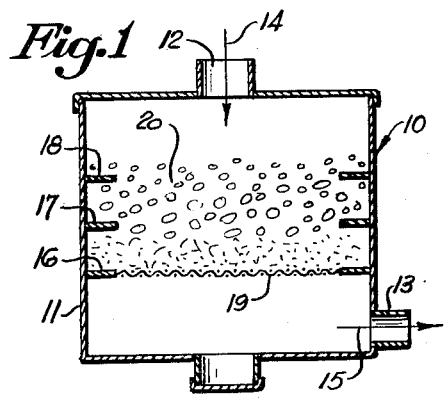
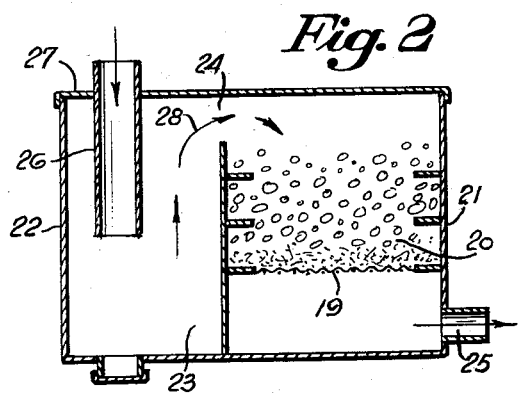
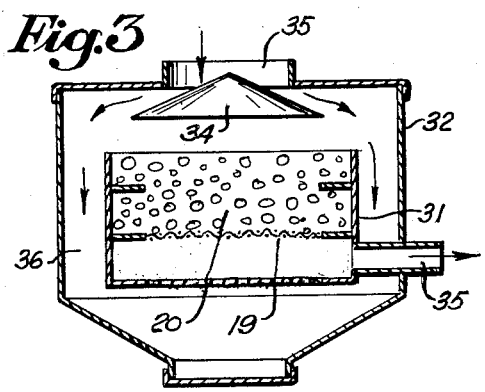
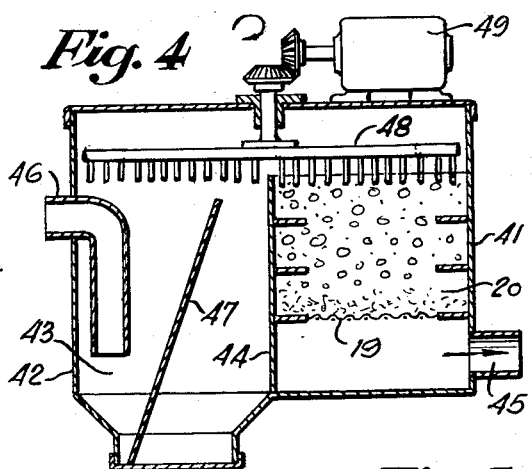
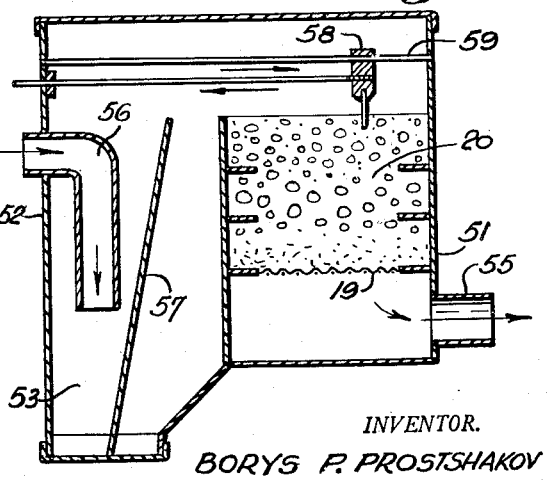
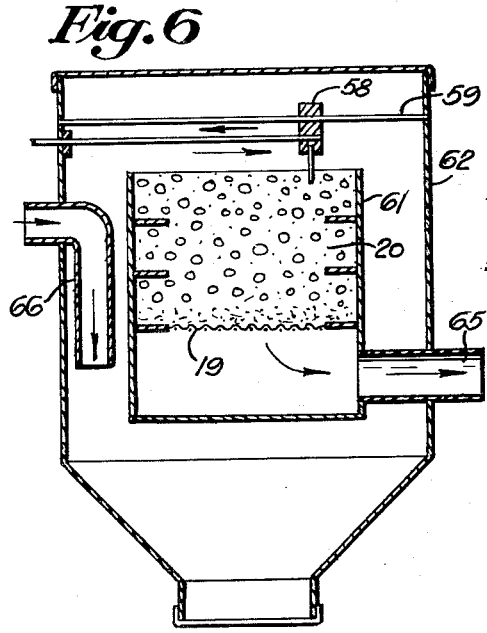
INVENTOR.
BORYS P. PROSTSHAKOV
ATTORNEYS

2,995,204
FLUID FILTER AND STRAINER
Borys P. Prostshakov, 496 E. 174th St., Bronx 57, New York, N.Y.
Filed Oct. 15, 1957, Ser. No. 690,270
1 Claim. (Cl. 183—49)

This invention relates to a fluid filter and strainer, and refers more particularly to filters and strainers for use in connection with air-conditioning units, internal combustion engines, as well as means for purifying the atmosphere and smoke, and dust removing means for the intake and exhaust of various engines.

In my co-pending United States patent application, Ser. No. 640,225, filed February 14, 1957, and now abandoned, I have described gas filters which include screens provided with a filter bed of filings. This bed of filings is subjected in its entirety, or as far as its top layer is concerned, to a vibratory or stirring movement, which may be created by external means or by the passage of the gas to be filtered through the filter bed.

Devices of this nature were found to operate most effectively in a number of instances. I have found, however, that additional means may be required for the filtering of minute dust particles, including those contained in smoke or fog. I have also found that additional expedients may be necessary for the simultaneous filtering of large amounts of gases or gases containing a large amount of dust or other particles.

Consequently, an object of the present invention is to improve the filters described in my above-mentioned patent application by the provision of means capable of removing dust, smoke and fog particles of even the smallest size.

Yet another object is the provision of filters capable of use for filtering simultaneously large amounts of gases and gases containing a large proportion of dust and other particles.

A further object is the utilization of a dust layer for the purpose of improving the filtering of fluids.

Still another object is the provision of a filter which is capable of effectively removing radioactive dust.

Other objects of the present invention will become apparent in the course of the following specification.

In accomplishing the objects of the present invention, it was found desirable to provide a filter having a perforated support and a filter bed, consisting of a layer of small separate particles upon the support, in conjunction with a casing containing the filter bed and provided with a plurality of inner shelf-like partitions which prevent a flow of the dust along the walls of the casing.

According to certain embodiments of the inventive idea, the chamber containing the filter bed is connected at its inlet end but not at its outlet end with another chamber, and the fluid to be filtered is caused to pass consecutively through the two chambers. Due to this arrangement, a layer of dust is deposited in the first chamber and this layer is used effectively for the filtering of subsequent charges of the fluid to be filtered.

The invention will appear more clearly from the following detailed description when taken in connection with the accompanying drawing showing by way of example preferred embodiments of the inventive idea.

In the drawing:
FIGURES 1 to 6 are vertical sections through differently constructed filters and strainers, all of which embody the principles of the present invention.

The filter and strainer 10 shown in FIGURE 1 includes a casing 11 which may be round or angular in cross section and which is provided at the top with an inlet 12 for the fluid to be filtered. The bottom of the casing 11 is provided with an outlet 13 for the filtered fluid. The fluid flows through the casing 11 in the direction of the arrows 14 and 15.

In accordance with the present invention, the casing 11 is provided with a series of shelf-like projections 16, 17 and 18, which are firmly attached to the inner walls of the casing 11 and extend inwardly toward the casing center. A screen 19 provided with a large number of openings and made preferably of a metal, a textile fabric, or other suitable material, may be placed upon the lowermost shelf 16. The screen 19 carries a layer 20 of metal filings or other suitable filings, or comminuted bodies of wood or other material.

The casing 11 is subjected to a vibratory movement in the manner described in my aforesaid patent application by any suitable means.

The operation of the illustrated filter and strainer is apparent from the above description.

The fluid to be filtered is introduced into the casing 11 through the inlet opening 12, flowing in the direction of the arrow 14. The fluid will pass through a layer 20 of comminuted particles and the screen 19, and will leave the casing 11 in a purified state flowing outwardly through the opening 13 in the direction of the arrow 15.

The partitions 16, 17 and 18 will prevent the passage of dust particles, particularly those of very small size, along the inner walls of the casing 11 and they will force the dust particles to pass through the layer 20. Thus, the possibility that some dust particles will reach the outlet 13 without passing through the filtering layer 20 is effectively avoided.

The filter and strainer shown in FIGURE 2 is particularly suitable for use in conjunction with large amounts of gases to be filtered and/or gases having a substantial amount of dust or other particles. This filter has a vibrating casing 21 similar to the previously described casing 11 and containing the same screen 19 carrying the filtering layer 20. Furthermore, the casing 21 may be provided with inner partitions of the above described type.

However, in this construction the casing 21 is connected to another casing 22 having a chamber 23 located next to the casing 21. The top of the chamber 23 is in communication with a passage 24 at the top of the casing 21. On the other hand, the outlet 25 of the casing 21 communicates with the chamber 23 only through the filtering layer 20. An inlet pipe 26 extends through the top 27, which serves as a cover not only for the chamber 23 but for the casing 21 as well.

The fluid to be filtered is introduced into the chamber 23 and it will rise upwardly in the chamber 23 until it reaches the passage 24, as is illustrated by the arrow 28. Then the fluid will flow downwardly through the filtering layer 20 and will leave the filter through the outlet 25.

It is apparent that in this construction the fluid is not caused to flow directly to the filter 20, but is allowed to pass through a preliminary chamber 23 before reaching the filtering layer 20, so that a layer of dust will be deposited outside of the filtering layer.

It should be noted in this connection that dust separated from its gaseous carrier and located upon any suitable granulated, comminuted or fibrous material including a fabric, constitutes the best possible filter for the charges of fluid flowing therethrough. It is merely necessary to maintain the thickness of the layer of dust within the limits necessary for the required extent of filtering and within the limits set by the hydraulic resistance of the filter.

The filter and strainer shown in FIGURE 3 comprises a vibrating casing 31, which is similar to those previously described and which includes the screen 19 carrying the filtering layer 20. In this construction the casing 31 is enclosed on all sides by the casing 32 which communicates with the top of the casing 31, but does not communicate with the bottom thereof. A conduit 35 used for the removal of purified fluid, extends from the bottom of the container 31.

A deflector 34 for the fluid to be purified is located within the casing 32 between the inlet 35 and the open top of the container 31.

In this construction the fluid to be purified, such as a gas containing lighter and heavier dust particles, enters the casing 32 through the opening 35 and is deflected by the deflector 34, so that the major portion of the fluid flows into the space 36 located within the container 32 and surrounding the container 31. The heavier dust particles will be deposited at the bottom of the container 32, while the lighter dust particles will rise gradually within the space 36 until they reach the top of the container 31 and will be filtered.

The combined filter and strainer shown in FIGURE 4 includes an inner casing 41 which is similar to those described and which contains a screen 19 and a filtering layer 20.

An outer, round casing 42 has an inner chamber 43 located next to the inner casing 41. The top of the chamber 43 is in communication with the top of the casing 41, while the bottoms of the two casings are separated by a wall 44, constituting a part of the inner casing 41. Purified fluid leaves the bottom of the casing 41 through the conduit 45. The wall 44 extends diagonally across the round casing 42 so that the inner casing 41 has the shape of a half-circle in cross-section.

Fluid which is to be purified is introduced into the bottom of the chamber 43 through a pipe 46 extending through the side wall of the casing 42. Preferably, the pipe 46 has the form of an elbow extending into the chamber 43.

A partition 47 having a flat upwardly extending surface is located within the chamber 43 and is used to facilitate the deposit of dust particles within the chamber 43. It is apparent that heavier dust particles will be deposited on that side of the partition 47 which is closer to the pipe 46.

The upper layer of the filter 20 is subjected to continuous stirring by means of a rotary rake 48 which is driven by an electrical motor 49 mounted upon the top of the casing 42. The teeth of the rake 48 are made of rubber, bristles, or other suitable resilient or flexible material so that they can move over the top edges of the wall 44.

It is apparent that the fluid to be filtered will be introduced into the chamber 43 through the pipe 46 and will gradually reach the top of the chamber 43; it will pass through a layer of previously deposited dust in the course of this movement. Then the fluid will pass into the interior of the container 41 and will be filtered through the filtering layer 20. In the course of the upward movement through the chamber 43, the fluid will pass through the dust particles. The accumulation of these dust particles in the chamber 43 is furthered by the partition wall 47. Furthermore, the rake 48 which maintains the upper portion of the filtering layer 20 in the container 41 in a continuously stirred condition will throw off some of the dust into the chamber 43.

It should be noted in this connection that in order to utilize the dust as a filtering material to the best possible extent, it is necessary to provide a layer of dust of such thickness that the desired extent of purification is attained. However, the thickness of the dust layer must be also within the limits determined by the hydraulic resistance of the filter. As is known, the hydraulic resistance diminishes with an increase in the effective surface of the filter and with a decrease in the thickness of the filtering layer of dust.

In the construction shown in FIGURE 4, and in the constructions described hereinafter, the desirable thickness of the layer of dust in a preliminary chamber is maintained through a continuous rate of stirring of the upper portion of the filtering layer in the main chamber and transfer of dust by the stirrer from the filtering layer into the preliminary chamber, such as the chamber 43. This is attained in the examples shown in FIGURE 4 by suitably regulating the speed of revolution of the rake 48.

The filter and strainer shown in FIGURE 5 is substantially similar in construction to the one shown in FIGURE 4; it includes an inner casing 51 having a screen 19 carrying a filtering layer 20. The outer casing 52 may be of rectangular shape and encloses an inner chamber 53, which receives gas to be filtered through a pipe 56. In this construction also there is a partition wall 57 in the chamber 43, the top of which is in communication with the top of the container 51. Purified gas is withdrawn from the bottom of the container 51 through the conduit 55.

In this construction the top layer of the filtering material is stirred by means of a reciprocating flexible or resilient stirrer upon a holder 58 mounted upon a shaft 59 and movable along the shaft 59 by any suitable means not shown in the drawing. In other respects, this construction is essentially the same as those previously described.

The combined filter and strainer shown in FIGURE 6 again includes an inner casing 61 carrying a screen 19 and a filtering layer 20. The inner casing 61 is surrounded by an outer casing 62, the bottom of which receives the gas to be filtered through an elbow pipe 66. Purified gas is withdrawn through the conduit 65. The upper portion of the filtering layer is stirred in this construction by a reciprocating stirrer 58, which is mounted upon the shaft 59 and which is of the same construction as the stirrer shown in FIGURE 5. This filter is operated in essentially the same manner as those previously described.

It is apparent that the examples shown above have been given solely by way of illustration and not by way of limitation, and that they are subject to many variations and modifications within the scope of the present invention. All such variations and modifications are to be included within the scope of the present invention.

What is claimed is:

A filter, comprising, in combination, an outer casing having side walls, a top cover and a bottom, said top cover having an opening formed therein for the inlet of the gaseous fluid to be filtered, an inner casing located within said outer casing and having side walls and means forming an outlet for said inner casing and extending through the side wall of said outer casing, said outlet means being located adjacent said bottom, said inner casing having an open top, the side walls of said inner casing being entirely spaced from the side walls of said outer casing to form an annular chamber located side by side with the interior of said inner casing and communicating with the opening of said top cover and with the open top of said inner casing, a deflector located within said outer casing below the opening of said top cover for deflecting the flow of said gaseous fluid passing through said opening toward said chamber, whereby said gaseous fluid will flow laterally toward the casing side walls, then downwardly toward the bottom of said chamber and then rise to reach the open top of said inner casing, a perforated support carried by said inner casing above said outlet means and extending across the entire interior of said inner casing, and a filter bed consisting of a layer of small separate grain-like particles carried by said support and filling the interior of said inner casing, shelf-like projections extending inwardly from the side walls of the inner casing and into said layer, said gaseous fluid flowing through said filter bed and around said projections toward said outlet opening and being subjected to vibrations along with the filter bed and said inner and outer casings.

(References on following page)

References Cited in the file of this patent
UNITED STATES PATENTS

| | | |
|---|---|---|
| 963,139 | Griffiths | July 15, 1910 |
| 1,058,034 | Christensen | Apr. 8, 1913 |
| 1,131,543 | Orr | Mar. 9, 1915 |
| 1,148,501 | Collins | Aug. 3, 1915 |
| 1,339,726 | Swarens | May 11, 1920 |
| 1,522,111 | Franck-Philipson | Jan. 6, 1925 |
| 1,538,150 | Wilson | May 19, 1925 |
| 1,549,158 | Smith | Aug. 11, 1925 |
| 1,577,715 | Hendrickson | Mar. 23, 1926 |
| 2,525,559 | Morel | Oct. 10, 1950 |